US008538962B2

(12) United States Patent
Shibata

(10) Patent No.: US 8,538,962 B2
(45) Date of Patent: Sep. 17, 2013

(54) INFORMATION PROCESSING DEVICE, CONTENT MANAGEMENT SYSTEM, METHOD, AND COMPUTER READABLE MEDIUM FOR MANAGING CONTENTS

(75) Inventor: Hiroshi Shibata, Aichi (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 546 days.

(21) Appl. No.: 12/397,816

(22) Filed: Mar. 4, 2009

(65) Prior Publication Data
US 2009/0234798 A1 Sep. 17, 2009

(30) Foreign Application Priority Data

Mar. 14, 2008 (JP) ................................. 2008-065130

(51) Int. Cl.
*G06F 7/00* (2006.01)
(52) U.S. Cl.
USPC ........... 707/736; 707/741; 707/899; 358/402; 358/403; 358/442; 358/462
(58) Field of Classification Search
None
See application file for complete search history.

(56) References Cited

U.S. PATENT DOCUMENTS

| | | | |
|---|---|---|---|
| 5,649,188 | A | 7/1997 | Nomura et al. |
| 7,239,406 | B1 * | 7/2007 | Piersol et al. ................. 358/1.15 |
| 7,304,759 | B2 * | 12/2007 | Kiyono et al. ............... 358/1.15 |
| 2005/0278379 | A1 * | 12/2005 | Nakazawa .................. 707/104.1 |

FOREIGN PATENT DOCUMENTS

| | | | |
|---|---|---|---|
| JP | H06-119393 | A | 4/1994 |
| JP | 2001231059 | A | 8/2001 |
| JP | 2002-232760 | A | 8/2002 |
| JP | 2005-020256 | A | 1/2005 |
| JP | 2005-352782 | A | 12/2005 |

OTHER PUBLICATIONS

Japan Patent Office; Notification of Reasons of Rejection in Japanese Patent Application No. 2008-065130 (counterpart to the above-captioned U.S. patent application) mailed May 25, 2010.
Japan Patent Office; Decision of Rejection in Japanese Patent Application No. 2008-065130 (counterpart to the above-captioned U.S. patent application) mailed Sep. 28, 2010.

* cited by examiner

*Primary Examiner* — Anh Tai Tran
(74) *Attorney, Agent, or Firm* — Baker Botts L.L.P.

(57) ABSTRACT

An information processing device includes an instruction accepting unit accepting an instruction, an acquiring unit acquiring content in one of a first mode for automatically beginning content acquisition and a second mode for beginning the content acquisition in response to an instruction to begin the content acquisition accepted through the instruction accepting unit, a storage storing the content, a keyword creating unit creating keywords for the content, a display unit displaying the keywords, and a controller configured to, when the content is acquired in the first mode, control the keyword creating unit and the display unit to create and display the keywords, respectively, in response to an instruction to access the content stored on the storage accepted through the instruction accepting unit. When the content is acquired in the second mode, the controller controls the keyword creating unit and the display unit to automatically create and display the keywords, respectively.

24 Claims, 12 Drawing Sheets

CONTENT TABLE

| ID | PATH TO DATA | TYPE | TELEPHONE NUMBER | F CODE | DATE AND TIME | PATH TO THUMBNAIL-SIZE IMAGE | SEARCH KEYWORD | ANALYSIS RESULT |
|---|---|---|---|---|---|---|---|---|
| D001 | \xx\xx\xxx.xxx | RECEIPT OF FACSIMILE DATA | xx-xx-xx | F001 | xx.xx.xx | \xx\xx\xxx.xxx | "UNREGISTERED" | AWAITING ANALYSIS |
| D002 | \xx\xx\xxx.xxx | TRANSMISSION OF FACSIMILE DATA | xx-xx-xx | F002 | xx.xx.xx | \xx\xx\xxx.xxx | "PROJECT A" | "PROJECT A" "COMPANY A" "PRODUCT A" |
| D003 | \xx\xx\xxx.xxx | RECEIPT OF FACSIMILE DATA | xx-xx-xx | F003 | xx.xx.xx | \xx\xx\xxx.xxx | "PROJECT A" | "PROJECT A" "COMPANY B" "PRODUCT B" |
| D004 | \xx\xx\xxx.xxx | RECORDING | xx-xx-xx | | xx.xx.xx | \xx\xx\xxx.xxx | "PROJECT B" | "PROJECT B" "COMPANY B" "PRODUCT B" |
| ⋯ | ⋯ | | ⋯ | ⋯ | ⋯ | ⋯ | ⋯ | ⋯ |

FIG. 9

INFORMATION PROCESSING DEVICE, CONTENT MANAGEMENT SYSTEM, METHOD, AND COMPUTER READABLE MEDIUM FOR MANAGING CONTENTS

CROSS-REFERENCE TO RELATED APPLICATION

This application claims priority under 35 U.S.C. §119 from Japanese Patent Application No. 2008-065130 filed on Mar. 14, 2008. The entire subject matter of the application is incorporated herein by reference.

BACKGROUND

1. Technical Field

The following description relates to one or more techniques for managing acquired contents so as to easily find a desired one of them.

2. Related Art

In recent years, an information processing device such as a printer and a facsimile machine is configured to acquire various kinds of contents. For example, a printer is adopted to acquire a data file to be printed (print content) from a terminal device. Further, a facsimile machine is adopted to receive facsimile data (facsimile content) or to acquire facsimile data to be transmitted (facsimile content) from a scanner unit or an external device. An information processing device with a telephone function can acquire (record) voice messages (voice communication content). It is convenient to save content acquired by an information processing device in a searchable fashion. In this case, it is desirable to save the acquired content in association with one or more keywords for searching the intended one of contents saved. In the following description, the keywords for searching will simply be referred to as "search keywords." A search keyword is designated by a user based on what kind of information is contained in the acquired content.

Japanese Patent Provisional Publication No. 2005-20256 discloses a data management device (a content management device) adopted such that the user can easily designate the search keywords. The data management device is connected with an image scanner via a network. The image scanner is configured to create a reduced image of scanned image data (image content) and transmit the reduced image to the data management device. The data management device extracts discriminative parameters from the reduced image received, and then extracts possible keywords associated with the reduced image based on the discriminative parameters. The possible keywords extracted are sent to the image scanner. The image scanner displays the possible keywords. Subsequently, the image scanner transmits to the data management device a keyword designated by the user among the possible keywords and the acquired image data. The data management device stores the image data scanned, and saves the keyword designated by the user as a search keyword in association with the image data.

SUMMARY

The image scanner always commences image scanning in response to a user operation. In this case, the user usually stands by the image scanner. Therefore, it is desirable for the image scanner to display the possible keywords immediately after acquiring the image data. In this case, the user can provide a search keyword to the image data immediately after causing the image scanner to scan the image data. However, the user does not necessarily stand by the information processing device when acquiring data depending on what kind of device the information processing device is. For example, the facsimile machine automatically receives facsimile data (facsimile content). In this case, since the user does not stand by the facsimile machine, it is meaningless to display the possible keywords at the time when the facsimile data is received. Further, for instance, in the case where the information processing device has a voice message recording function, it is meaningless to display the possible keywords at the time when a voice message is automatically recorded. Thus, a content management technique is desired which is adopted to provide the possible keywords in a timely fashion at user's convenience.

When the user stands by the information processing device, the information processing device is preferred to provide possible keywords for content immediately after acquiring the content. On the other hand, when the user does not stand by the information processing device, the information processing device is preferred to display the possible keywords not at the time when acquiring the content but in response to a user operation.

Aspects of the present invention are advantageous to provide one or more improved information processing devices, content management systems, methods and computer readable media for managing contents that make it possible to provide possible keywords for content immediately after acquiring the content when a user stands by the information processing devices and to provide the possible keywords not at the time of acquiring the content but in response to a user operation when the user does not stand by the information processing devices.

According to aspects of the present invention, an information processing device is provided, which is configured to manage acquired content in association with at least one keyword. The information processing device includes an instruction accepting unit configured to accept an instruction, an acquiring unit configured to acquire content in one of a first mode and a second mode, the first mode being a mode in which acquisition of the content is automatically begun, the second mode being a mode in which the acquisition of the content is begun in response to an instruction to begin the content acquisition being accepted through the instruction accepting unit, a storage configured to store the content acquired by the acquiring unit, a keyword creating unit configured to create keywords for specifying the acquired content, a display unit configured to display the keywords created by the keyword creating unit, and a controller configured to, when the content is acquired in the first mode, control the keyword creating unit and the display unit to create and display the keywords, respectively, in response to an instruction to access the content stored on the storage being accepted through the instruction accepting unit, the controller being configured to, when the content is acquired in the second mode, control the keyword creating unit and the display unit to create and display the keywords, respectively, automatically after the acquisition of the content is begun.

In some aspects of the present invention, when the acquiring unit acquires the content in the second mode, namely, when the user is likely to stand by the information processing device, a list of the keywords created is automatically displayed at the time of the content acquisition. Meanwhile, when the acquisition unit acquires the content in the first mode, namely, when the user is not likely to stand by the information processing device, the list of the keywords is displayed in response to a user instruction to access the content stored on the storage. Thus, the information processing device can provide the list of the keywords in a timely fashion at user's convenience.

According to aspects of the present invention, further provided is a content management system configured to manage acquired content in association with at least one keyword. The content management system includes an instruction accepting unit configured to accept an instruction, an acquiring unit configured to acquire content in one of a first mode and a second mode, the first mode being a mode in which acquisition of the content is automatically begun, the second mode being a mode in which the acquisition of the content is begun in response to an instruction to begin the content acquisition being accepted through the instruction accepting unit, a storage configured to store the content acquired by the acquiring unit, a keyword creating unit configured to create keywords for specifying the acquired content, a display unit configured to display the keywords created by the keyword creating unit, and a controller configured to, when the content is acquired in the first mode, control the keyword creating unit and the display unit to create and display the keywords, respectively, in response to an instruction to access the content stored on the storage being accepted through the instruction accepting unit, the controller being configured to, when the content is acquired in the second mode, control the keyword creating unit and the display unit to create and display the keywords, respectively, automatically after the acquisition of the content is begun.

In some aspects of the present invention, the content management system configured as above can also provide the same effects as the aforementioned information processing device.

According to aspects of the present invention, further provided is a method for managing acquired content in association with at least one keyword. The method includes an acquiring step of acquiring content in one of a first mode and a second mode, the first mode being a mode in which acquisition of the content is automatically begun, the second mode being a mode in which the acquisition of the content is begun in response to an instruction to begin the content acquisition being accepted, a storing step of storing the content acquired in the acquiring step, a keyword creating step of creating keywords for specifying the acquired content, a displaying step of displaying the keywords created in the keyword creating step, and a controlling step in which, when the content is acquired in the first mode, the keyword creating unit and the display unit are controlled to create and display the keywords, respectively, in response to an instruction to access the content stored on the storage being accepted, the controlling step in which, when the content is acquired in the second mode, the keyword creating unit and the display unit are controlled to create and display the keywords, respectively, automatically after the acquisition of the content is begun.

In some aspects of the present invention, the method adopted as above can as well provide the same effects as the aforementioned information processing device.

According to aspects of the present invention, further provided is a computer readable medium having computer executable instructions stored thereon, which cause a computer to perform an acquiring step of acquiring content in one of a first mode and a second mode, the first mode being a mode in which acquisition of the content is automatically begun, the second mode being a mode in which the acquisition of the content is begun in response to an instruction to begin the content acquisition being accepted, a storing step of storing the content acquired in the acquiring step, a keyword creating step of creating keywords for specifying the acquired content, a displaying step of displaying the keywords created in the keyword creating step, and a controlling step in which, when the content is acquired in the first mode, the keyword creating unit and the display unit are controlled to create and display the keywords, respectively, in response to an instruction to access the content stored on the storage being accepted, the controlling step in which, when the content is acquired in the second mode, the keyword creating unit and the display unit are controlled to create and display the keywords, respectively, automatically after the acquisition of the content is begun.

In some aspects of the present invention, the computer readable medium adopted as above can as well provide the same effects as the aforementioned information processing device.

According to aspects of the present invention, further provided is an information processing device configured to be connected with an external device. The information processing device includes an instruction accepting unit configured to accept an instruction, an acquiring unit configured to acquire content in one of a first mode and a second mode, the first mode being a mode in which acquisition of the content is automatically begun and the acquired content is transmitted to the external device, the second mode being a mode in which the acquisition of the content is begun in response to an instruction to begin the content acquisition being accepted through the instruction accepting unit, a keyword requesting unit configured to issue a request for keywords to the external device, a keyword receiving unit configured to receive keywords from the external device, a display unit configured to display the keywords received by the keyword receiving unit, and a controller configured to, when the content is acquired in the first mode, in response to an instruction to access the content on the external device being accepted through the instruction accepting unit, control the keyword requesting unit to issue the request for keywords to the external device, control the keyword receiving unit to receive the keywords from the external device, and control the display unit to display the received keywords. Further, the controller is configured to, when the content is acquired in the second mode, automatically after the acquisition of the content is begun, control the keyword requesting unit to issue the request for keywords to the external device, control the keyword receiving unit to receive the keywords from the external device, and control the display unit to display the received keywords.

In some aspects of the present invention, the information processing device configured as above can as well provide the same effects as the aforementioned information processing device.

BRIEF DESCRIPTION OF THE ACCOMPANYING DRAWINGS

Figure 7:
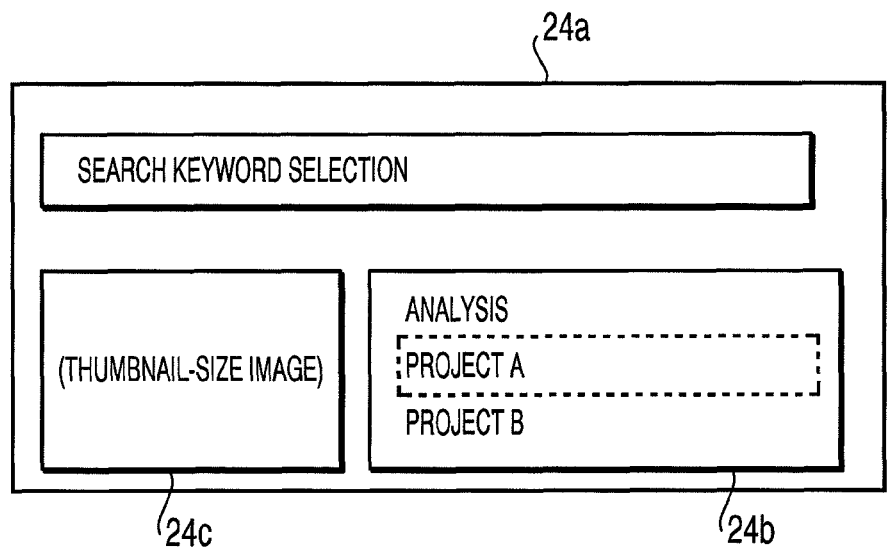

FIG. 7 exemplifies a display on the MFD in the embodiment according to one or more aspects of the present invention.

Figure 8:
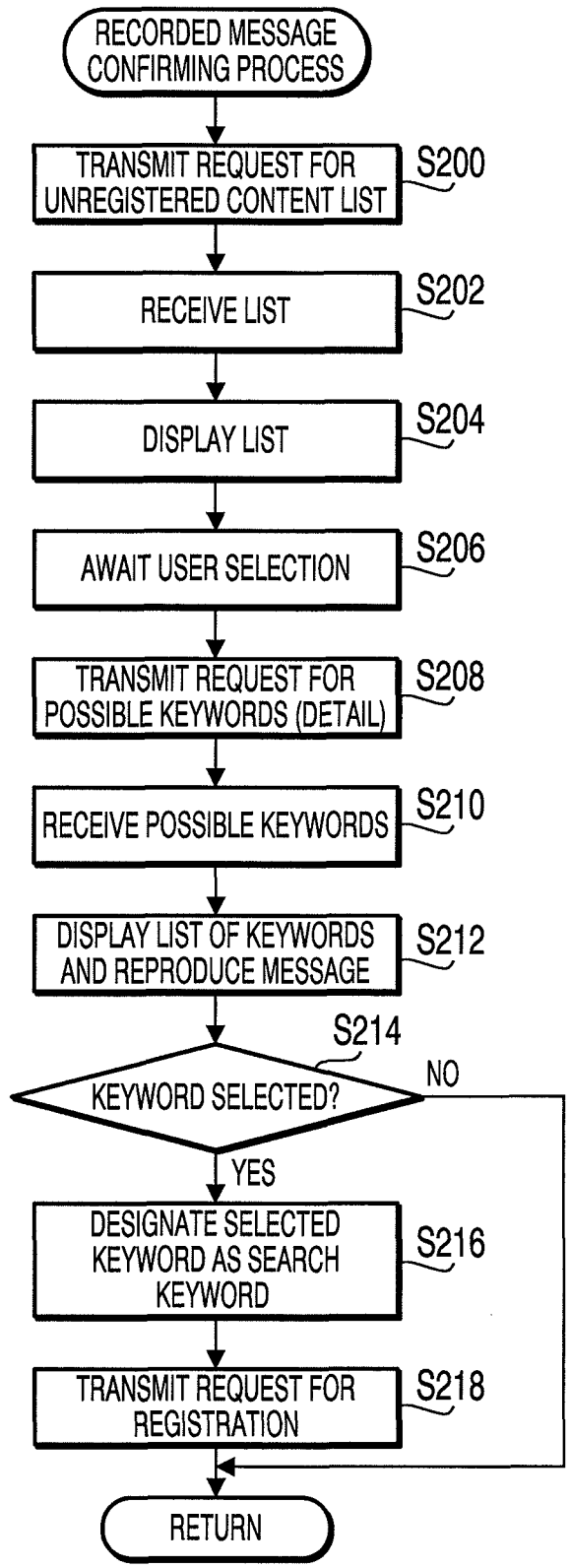

FIG. 8 is a flowchart showing a procedure of a recorded message confirming process in the embodiment according to one or more aspects of the present invention.

FIG. 9 exemplifies a structure of a content table in the embodiment according to one or more aspects of the present invention.

Figure 10:
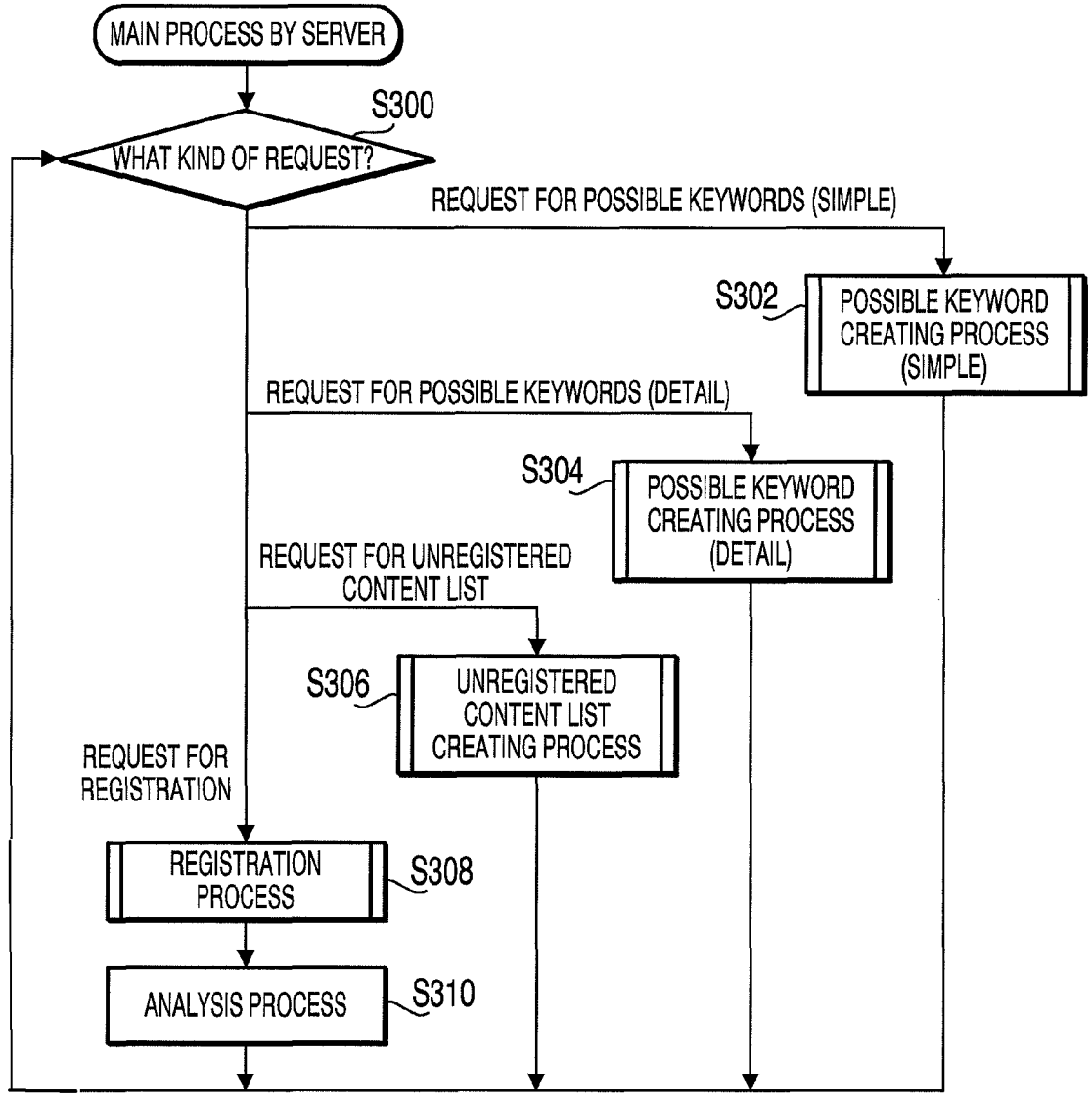

FIG. 10 is a flowchart showing a procedure of a main process to be executed by the server in the embodiment according to one or more aspects of the present invention.

Figure 11:
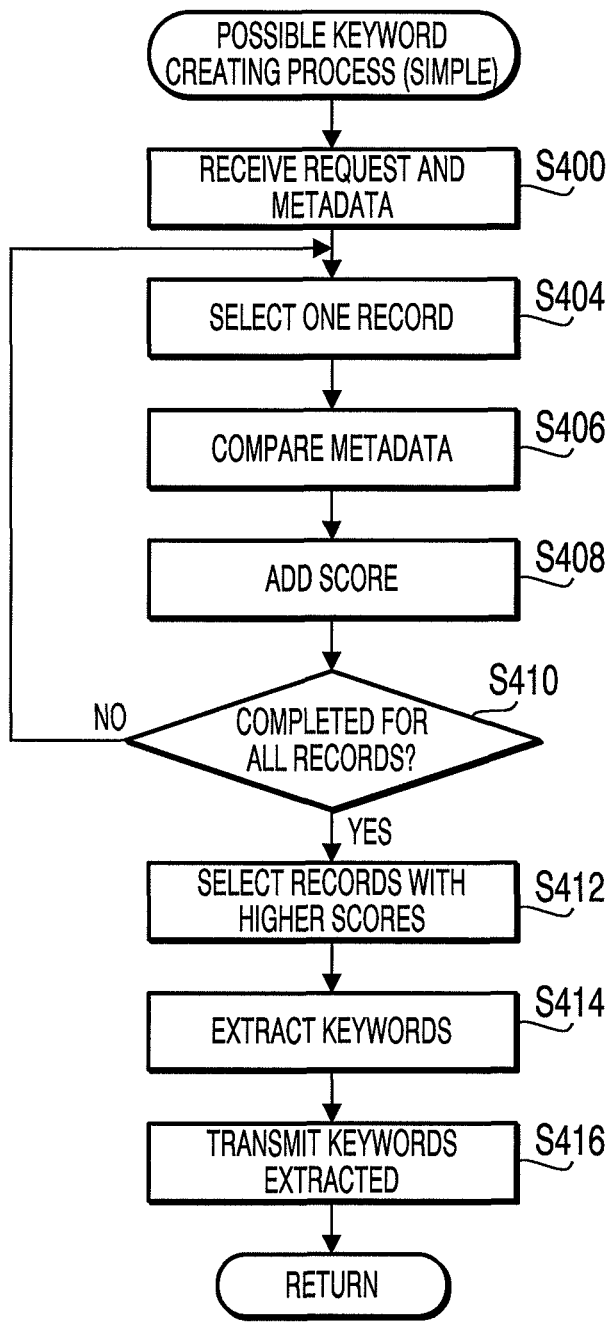

FIG. 11 is a flowchart showing a procedure of a possible keyword creating process (simple) in the embodiment according to one or more aspects of the present invention.

Figure 12:
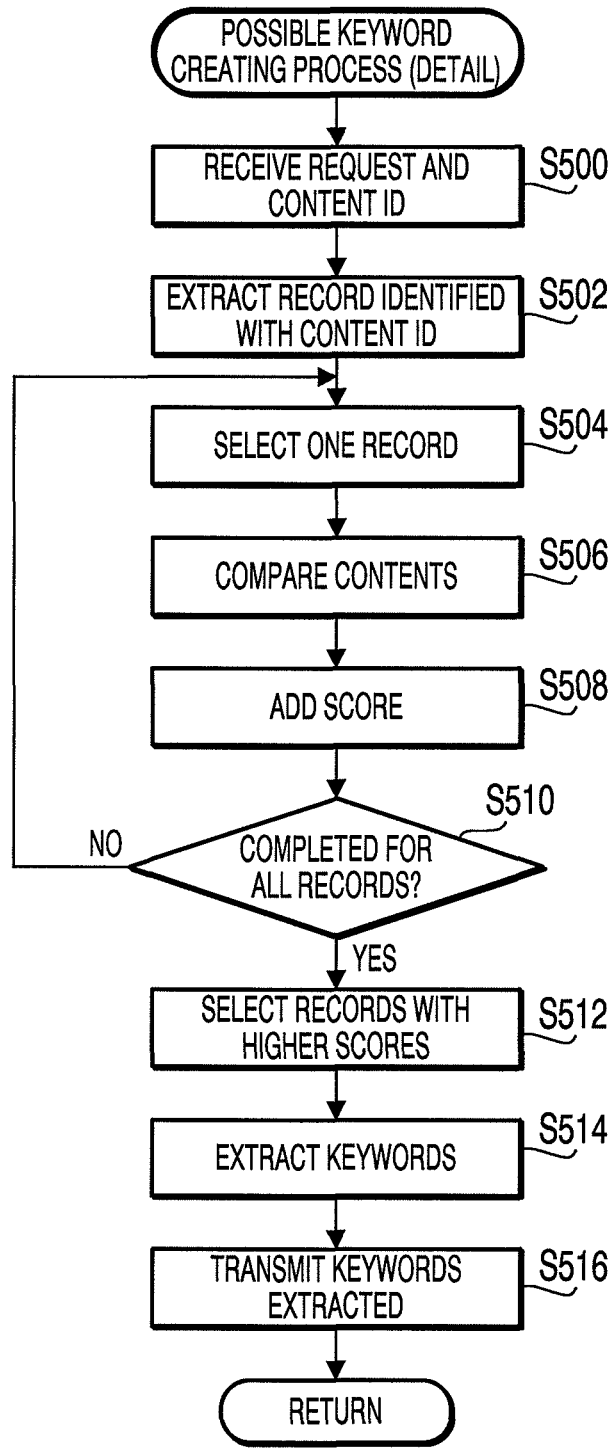

FIG. 12 is a flowchart showing a procedure of a possible keyword creating process (detail) in the embodiment according to one or more aspects of the present invention.

Figure 13:
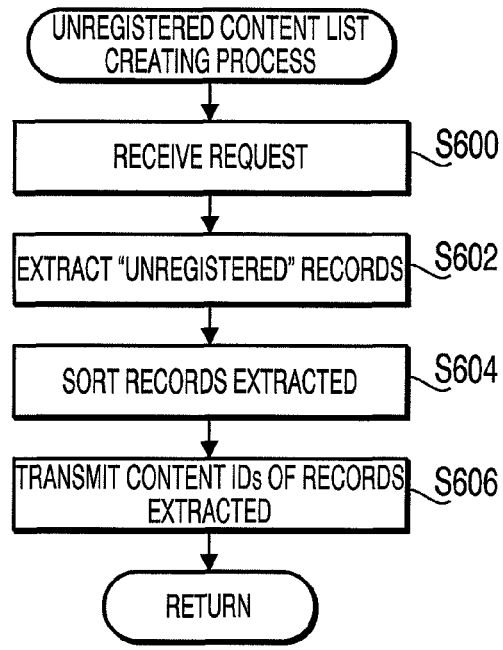

FIG. 13 is a flowchart showing a procedure of an unregistered content list creating process in the embodiment according to one or more aspects of the present invention.

Figure 14:
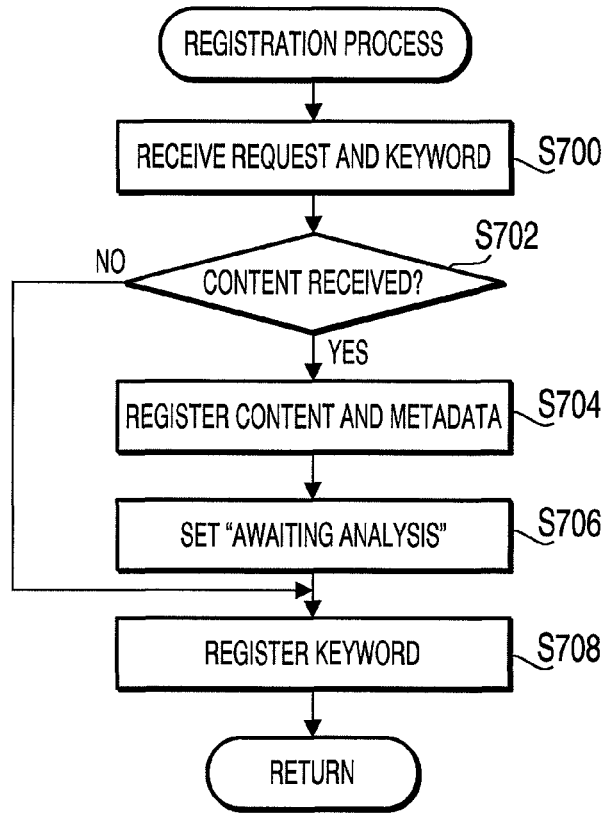

FIG. 14 is a flowchart showing a procedure of a registration process in the embodiment according to one or more aspects of the present invention.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the invention may be implemented in computer software as programs storable on computer-readable media including but not limited to RAMs, ROMs, flash memory, EEPROMs, CD-media, DVD-media, temporary storage, hard disk drives, floppy drives, permanent storage, and the like.

An information processing device in an embodiment according to aspects of the present invention will be described with reference to the accompanying drawings. The information processing device in the embodiment is configured with a Multi Function Device (MFD) and a server communicable with the MFD via a network. Hereinafter, for the sake of simple explanation, the combination of the MFD and the server will be referred to as a "content management system."

1. Configuration of System

Figure 1:
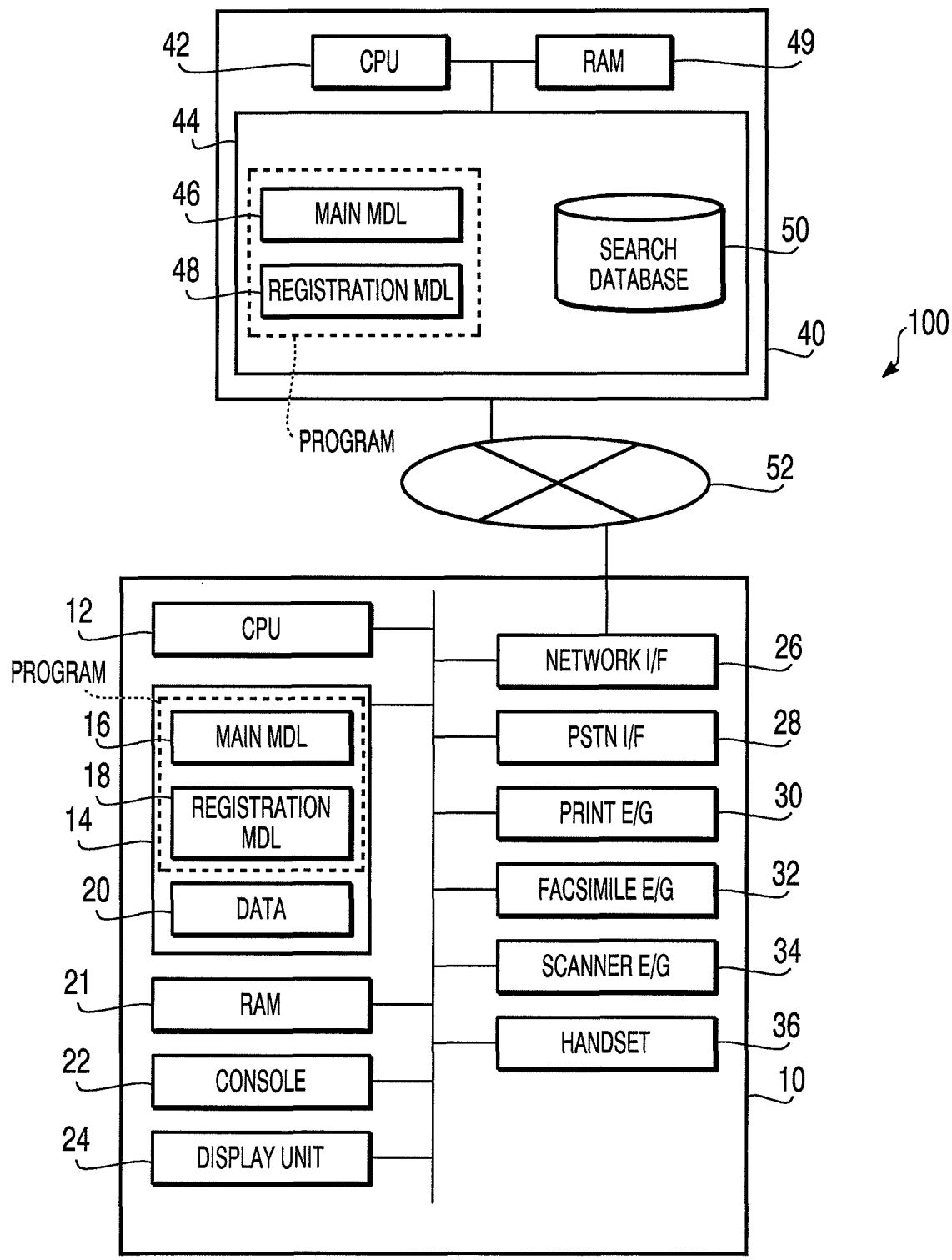
FIG. 1 is a block diagram schematically showing a configuration of a content management system in an embodiment according to one or more aspects of the present invention.

FIG. 1 is a block diagram schematically showing a content management system 100. The content management system 100 is configured with a server 40 (a terminal device) and an MFD 10 that are connected with a network 52. The MFD 10 has a print function, a facsimile function, a scanner function, and a telephone function. The server 40 and the MFD 10 are adopted to mutually communicate via the network 52. The MFD 10 includes a CPU 12, a storage 14, a RAM 21, a console 22, a display unit 24, a network interface 26, a Public Switched Telephone Networks (PSTN) interface 28, a print engine 30, a facsimile engine 32, a scanner engine 34, and a handset 36. It is noted that characters "I/F," "E/G," and "MDL" shown in FIG. 1 denote "interface," "engine," and "module," respectively. The "engine" may be replaced with "unit."

The CPU 12 controls the MFD 10 in accordance with various programs stored on the storage 14. The programs stored on the storage 14 include a main module 16 and a registration module 18. The main module 16 is a program adopted to take overall control of the MFD 10. Functions which the registration module 18 serves will be described later. The storage 14 stores various data 20. The RAM 21 temporarily stores content acquired and/or data transmitted by the server 40 (e.g., a list of keywords).

The console 22 is hardware to be operated by a user. The user can issue an intended command to the MFD 10 through operating the console 22. The network interface 26 is an interface for communicating with the server 40 via the network 52. The PSTN interface 28 is an interface through which the MFD 10 is connected with a public telephone line (not shown). The MFD 10 can transmit and receive telephone communication data or facsimile data (content) via the public telephone line. The print engine 30 is configured to attain the print function. The facsimile engine 32 is configured to attain the facsimile function. The scanner engine 34 is configured to attain the scanner function. The handset 36 is used for the telephone function. The MFD 10 is adopted to receive content from a terminal device connected with the network 52 and print the content received. Additionally, the MFD 10 is configured to send and receive facsimile data (facsimile content). In addition, the MFD 10 is adopted to scan content such as a text and an image printed on a sheet. Further, the MFD 10 is configured to record voice messages (voice communication content) received from another telephone device (not shown). Moreover, the MFD 10 is adopted to be set in an automatic message recording mode. In the automatic message recording mode, the MFD 10 records a voice message from another telephone device when the user of the MFD 10 cannot answer a call from the telephone device. Namely, the MFD 10 is adopted to record an incoming voice message in the automatic message recording mode. Thus, the MFD 10 can acquire the print content, the scanned content, the facsimile content, and the voice communication content. In the following description, data that is received, scanned, or recorded by the MFD 10 will simply and generically be referred to as "content."

Each of the functions of the MFD 10 works in either of two modes. One of the two modes is a mode (automatic acquisition mode) in which the MFD 10 automatically begins to acquire content without any user operation. Receipt of the facsimile content, automatic recording of the voice communication content in the automatic message recording mode, and receipt of an e-mail (mail content) are categorized as functions in the automatic acquisition mode. Namely, the automatic message recording mode is included in the automatic acquisition mode. Each function set in the automatic acquisition mode is executed in accordance with settings which are configured based on setting items of each function for acquiring the content (e.g., the telephone function and the facsimile function). The other one of the two modes is a mode (manual acquisition mode) in which the MFD 10 begins to acquire content in response to a user operation. Transmission of the print content, the scanned content, and the facsimile content, and recording of a voice message (voice communication content) during voice communication using the telephone function are categorized as functions in the manual acquisition mode. The manual acquisition mode is set for each function to acquire the content, for example, when the aforementioned automatic acquisition mode is not set.

The server 40 is provided with a CPU 42, a storage 44, and a RAM 49. The storage 44 is configured to store various programs, which include a main module 46 and a registration module 48. The main module 46 is configured to take overall control of the server 40. Functions of the registration module 48 will be explained later. Additionally, the storage 44 stores a search database 50 in which content received by the MFD 10 is registered in a searchable fashion. The RAM 49 is configured to temporarily store data (including content) transmitted by the MFD 10.

The content acquired by the MFD 10 is sent to the server 40 and then managed by the server 40. The server 40 registers the content on the search database 50. On the search database 50, each content is associated with a keyword for search (search keyword). Namely, the content management system 100 registers on the search database 50 the content acquired by the MFD 10 in association with a search keyword. At this time, the content and the search keyword are registered through cooperative operations between the registration module 18 of the MFD 10 and the registration module 48 of the server 40. Hereinafter, the registration module 18 of the MFD 10 will be referred to as a device-side registration module 18. Further, the registration module 48 of the server 40 will be referred to as a terminal-side registration module 48. A search keyword associated with each content is designated by the user. The cooperative operations between the device-side registration module 18 and the terminal-side registration module 48 actualize a system that makes it possible for the user to easily designate the search keyword. In the embodiment, the search keyword serves as a group name for managing contents acquired by the MFD 10 by classifying the contents into some groups.

2. General Overview of Processes

Figure 2:
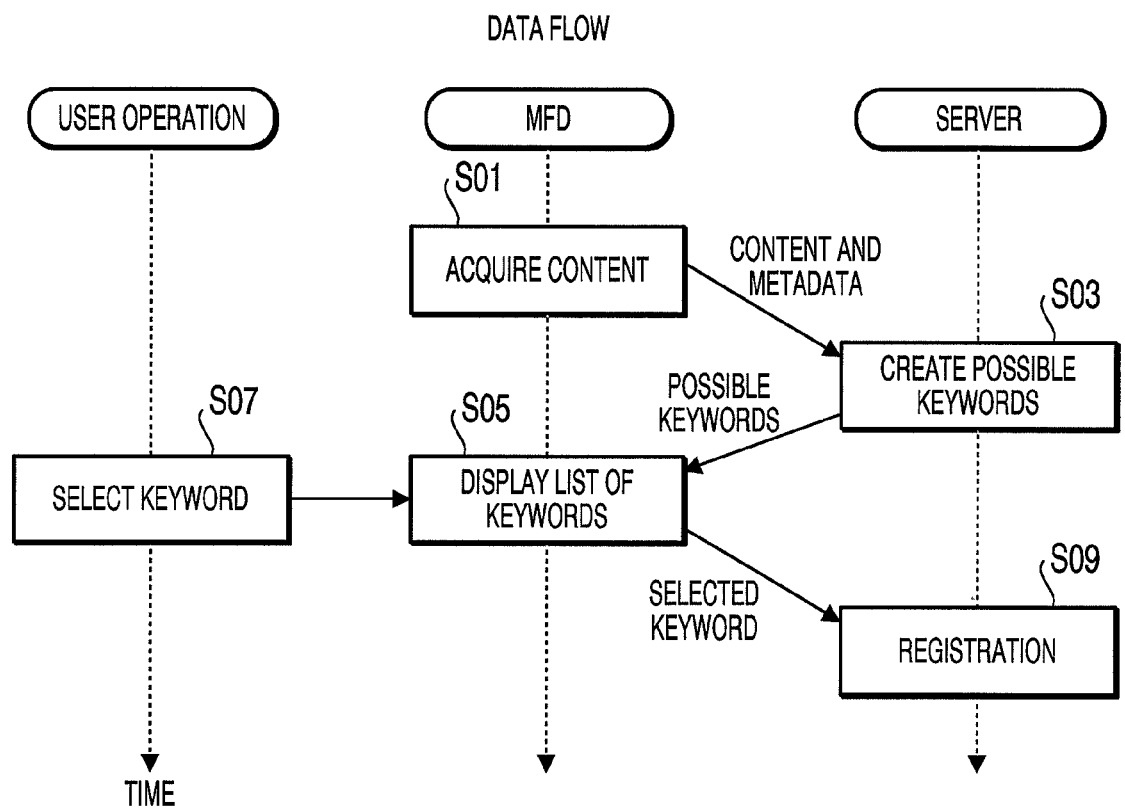
FIG. 2 is a schematic diagram showing data flows between a Multi Function Device (MFD) and a server in the embodiment according to one or more aspects of the present invention.

A general overview of the cooperative operation executed between the device-side registration module 18 and the terminal-side registration module 48 will be described. FIG. 2 schematically shows a data flow between the MFD 10 and the server 40. A user operation is shown on a left side in FIG. 2. In addition, operations to be executed by the MFD 10 are shown in a center in FIG. 2. Further, operations to be executed by the server 40 are shown on a right side in FIG. 2. Firstly, the MFD 10 acquires content (S01). The acquired content is temporarily stored on the RAM 21 of the MFD 10. The content is data such as a voice message, a received facsimile data, and an e-mail. The MFD 10 acquires metadata about the content at the time to acquire the content. The metadata includes a plurality of items such as a telephone number and an e-mail address of a sending source of the content, an acquisition time of the content, and a type of a function employed for acquiring the content (for example, which represents receipt of facsimile data, transmission of facsimile data, receipt of an e-mail, or transmission of an e-mail). When a function employed for acquiring the content is receipt of facsimile data, the metadata includes an F code. The MFD 10 transmits to the server 40 the acquired content and metadata along with a request for keywords. In response to the request for keywords, the server 40 creates, based on the acquired content and metadata, a plurality of keywords that may be registered in association with the content acquired (S03). It is noted, at this time, the server 40 may create the keywords based on at least one of the content and the metadata. As will be mentioned below, the user selects one or more keywords from the plurality of keywords displayed. The content management system 100 registers the one or more keywords selected by the user as the search keywords for the content acquired. Thus, hereinafter, the plurality of keywords created in the step S03 will be referred to as "possible keywords." The server 40 transmits the possible keywords created to the MFD 10. The MFD 10 displays a list of the possible keywords received (keyword list) (S05). It is noted that the MFD 10 temporarily stores the possible keywords received (keyword list) on the RAM 21. By operating the console 22, the user selects one or more desired keywords from the keyword list displayed (S07). The MFD 10 transmits the keywords selected by the user to the server 40. The server 40 registers on the search database 50 the acquired content in association with the selected keywords (S09).

Figure 3:
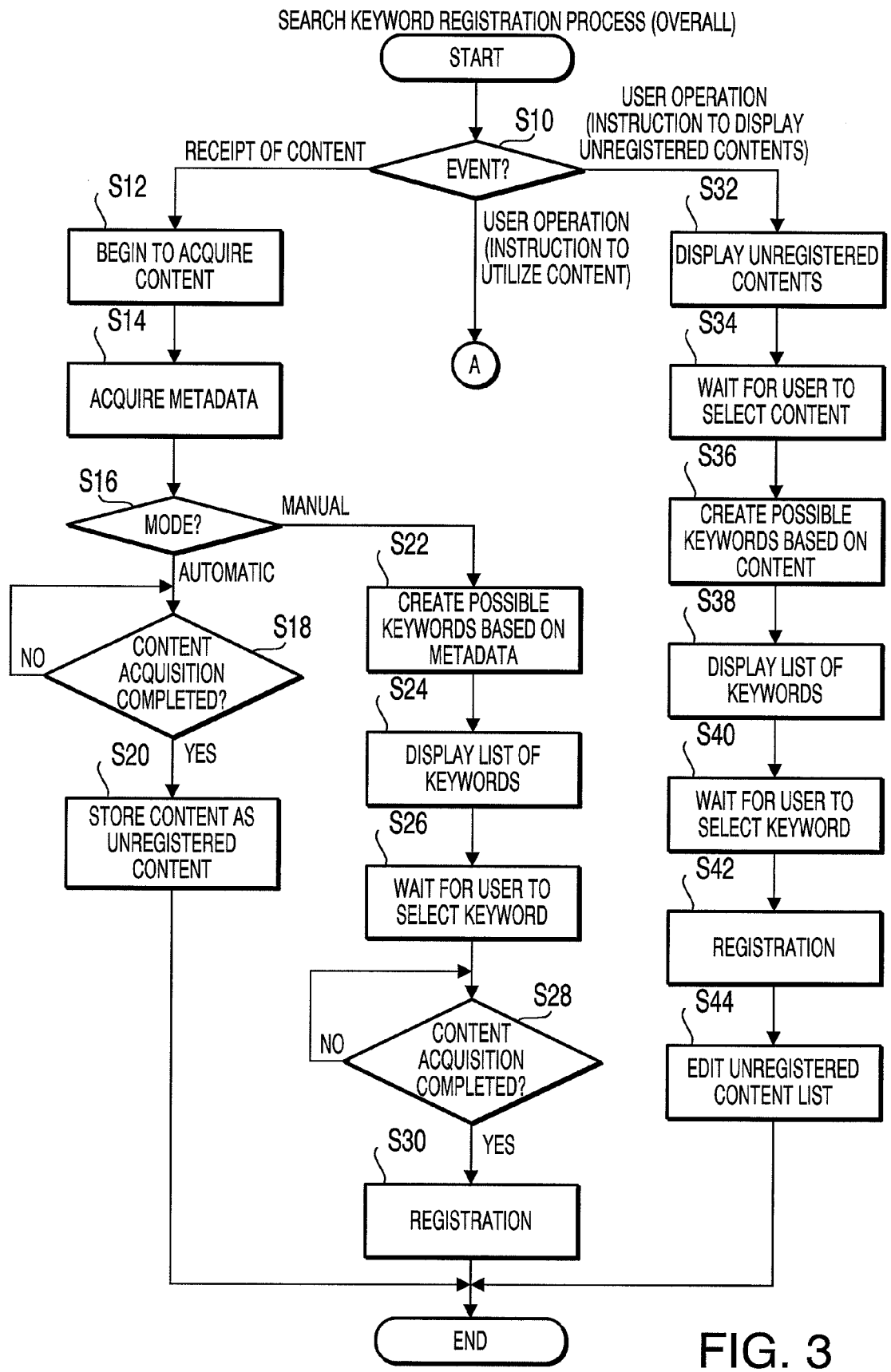
FIGS. 3 and 4 show a single flowchart of a search keyword registering process in the embodiment according to one or more aspects of the present invention.
Figure 4:
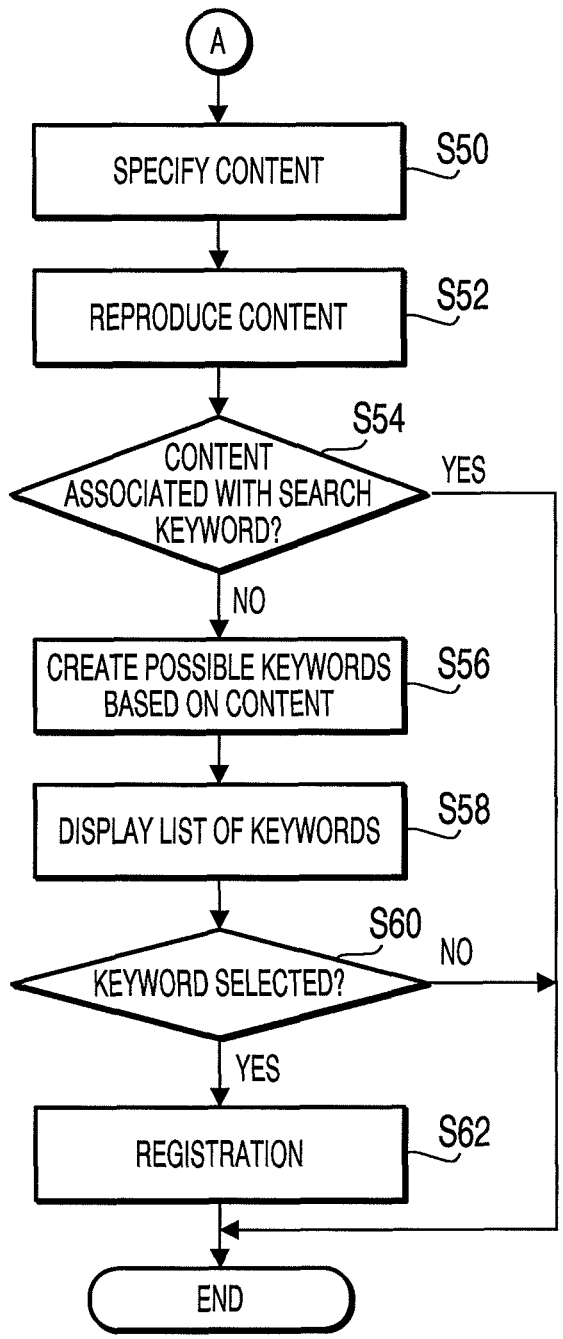

FIGS. 3 and 4 show a flowchart schematically showing a search keyword registering process. FIGS. 3 and 4 provide a single flowchart collectively showing operations to be executed by the MFD 10 and the server 40. When receiving the content (S10: Receipt of Content), the content management system 100 begins to acquire the content (S12). At the same time as the start of the content acquisition, the content management system 100 acquires metadata about the content (S14). When the function of the MFD 10 for acquiring the content is set in the automatic acquisition mode (S16: Automatic), namely when the content is automatically acquired, after completely acquiring the content (SI 8: Yes), the content management system 100 stores the acquired content as unregistered content (S20). At this time, the metadata is saved as well. The cases where the content is automatically acquired include a case where a voice massage is automatically recorded in the automatic message recording mode and a case where facsimile data is automatically received. The "unregistered content" represents content which is not associated with any keyword (in this respect, however, the "unregistered content" may be associated with a below-mentioned character string "unregistered"). Namely, the "unregistered content" denotes content which any operation has not been executed to associate with a search keyword.

When the function of the MFD 10 for acquiring the content is set in the manual acquisition mode (S16: Manual), namely when the acquisition of the content is begun in response to a user operation for issuing a start command, the content management system 100 creates possible keywords based on the metadata (S22) without waiting for the content to be completely acquired. It is noted that, in the manual acquisition mode, the acquisition of the content in S12 is not automatically started. In the manual acquisition mode, the MFD 10 automatically begins only acquisition of the metadata about the content. In the manual acquisition mode, the acquisition of the content is begun in response to an explicit instruction (start command) issued by the user. The start command may be issued by an off-hook operation of the handset 36, a key operation for transmitting the facsimile content, or a key operation for printing or copying the content. In S22, the possible keywords are created in accordance with the following procedure. Referring to the search database 50, the content management system 100 extracts content that have metadata identical to (or similar to) the metadata about the content acquired this time. The content management system 100 specifies search keywords associated with the content extracted. Then, the content management system 100 employs the search keywords specified as possible keywords for the content acquired this time. Subsequently, the content management system 100 creates and displays a list of the possible keywords (keyword list) (S24). Then, the content management system 100 waits for the user to select intended one or more of the possible keywords (S26). It is noted that the steps S24 and S26 in FIG. 3 correspond to the step S05 in FIG. 2. Here, the user selects intended ones of the possible keywords (namely, keywords that the user desires to associate with the content acquired) with reference to the keyword list displayed. The selection of the intended keywords by the user corresponds to the step S07 in FIG. 2. After the content is completely acquired (S28: Yes), the content management system 100 registers on the search database 50 the possible keywords selected by the user in association with the content acquired (S30). Namely, the content management system 100 registers the possible keywords selected by the user as the search keywords for the content acquired.

When the function of the MFD 10 for acquiring the content is set in the automatic acquisition mode (S16: Automatic), the content acquired is stored with any search keyword not registered in association with the content (S20). The user can operate the content management system 100 at a good time for the user to associate the unregistered content with the search keywords. Flows indicated by "User Operation" in S10 represent operations to provide the search keywords for the unregistered content. The flows indicated by "User Operation" include a flow in response to an instruction to display the unregistered contents and a flow in response to an instruction to utilize content. Since the instructions request the MFD 10 to access the stored contents, the instructions may be collectively referred to as "instructions to access the stored contents." The content management system 100 executes the step S32 or S50 in response to an actually issued one of the instructions to access the stored contents.

Hereinafter, a process to be executed when the content management system 100 receives the instruction to display the unregistered contents in S10 will be described. The user inputs the instruction to display the unregistered contents by operating the content management system 100 (namely, by operating the MFD 10). The content management system 100 outputs the unregistered contents stored in S20 in response to the user operation (S32). It is noted that when the contents are sound data such as the voice communication contents, the contents may be outputted from a speaker (not shown). Meanwhile, when the contents are displayable data such as images and texts, the contents may be displayed on the display unit 24. Then, the content management system 100 waits for the user to select a desired one of the unregistered contents (S34).

A plurality of contents may be stored as the unregistered contents before a user operation is given. Therefore, in S32, a plurality of unregistered contents may be displayed. In this case, the user selects content which the user desires to associate with search keywords from the plurality of unregistered contents displayed as a list of unregistered contents. The content management system 100 creates possible keywords for the content designated by the user (S36). Specifically, in S36, the possible keywords are created based on the selected content in accordance with the following procedure. Firstly, the content management system 100 extracts words from the content. In the case where the content is image data, the content management system 100 extracts words from the image data with an Optical Character Reader (OCR). Additionally, in the case where the content is sound data, the content management system 100 extracts words from the sound data by using a voice-recognition technology. The content management system 100 extracts content acquired in the past that include words identical to (or similar to) the words included in the content acquired this time with reference to the search database 100. The content management system 100 specifies one or more search keywords associated with the extracted content. The content management system 100 employs the specified search keywords as possible keywords for the content designated by the user in S34. The steps S38, S40, and S42 are identical to the aforementioned steps S24, S26, and S30, respectively. Finally, the content management system 100 deletes the content with the search keywords registered therefor from the list of unregistered contents (S44).

Subsequently, a process to be executed when the content management system 100 receives the instruction to utilize content stored in S10 will be described (see FIG. 4). When the user designates content that the user desires to utilize, for example, by operating the console 22 of the MFD 10, the content management system 100 specifies the content that the user desires to utilize (S50). Next, the content management system 100 extracts the specified content from the search database 50. The content management system 100 reproduces the extracted content (S52). While reproducing the extracted content, the content management system 100 determines whether the extracted content is associated with a search keyword (S54). When the extracted content is associated with a search keyword (S54: Yes), the content management system 100 terminates the present process after completing the reproduction of the extracted content. When the extracted content is not associated with any search keywords (S54: No), the content management system 100 creates possible keywords based on the extracted content (S56). An operation to be executed in S56 is identical to the operation in the aforementioned step S36. Subsequently, the content management system 100 displays a list of the possible keywords created (keyword list) (S58). Then, the content management system 100 waits for the user to select a keyword (S60). When the user selects possible keywords from the keyword list displayed (S60: Yes), the content management system 100 registers on the search database 50 the selected possible keywords in association with the content specified in S50 (S62). When the user does not select any possible keywords from the keyword list displayed (S60: No), the content management system 100 terminates the present process when completing the reproduction of the content.

The technical features of the content management system 100 will be cited below. When the function of the content management system 100 for acquiring the content is set in the manual acquisition mode, namely, when the content management system 100 begins to acquire data in response to the user operation, the content management system 100 automatically displays the keyword list along with starting the content acquiring operation (S16: Manual, and S24). On the other hand, when the content management system 100 automatically begins to acquire content without any user operation and registers the acquired content on the search database 50, the content management system 100 displays the keyword list in response to the user instruction to access the stored contents being accepted (S10: User Operation, and S38 or S58). Each of the steps S24, S38, and S58 can be referred to as a keyword displaying step (step of displaying the keyword list). The keyword displaying step is executed in response to the user instruction to access the stored contents being accepted when the function of the content management system 100 for acquiring the content is set in the automatic acquisition mode (when the content acquisition is automatically begun without any user operation). Meanwhile, the keyword displaying step is automatically executed in response to the content acquisition being begun when the function of the content management system 100 for acquiring the content is set in the manual acquisition mode (when the content acquisition is begun in response to the user operation).

When the content management system 100 begins to acquire the content in response to the user operation, the content management system 100 creates possible keywords based on the metadata (S22). Meanwhile, when the content management system 100 automatically begins to acquire the content without any user operation, the content management system 100 creates possible keywords based on the content (S36 or S56). Each of the steps S22, S36, and S56 can be referred to as a keyword creating step.

When the content management system 100 begins to acquire the content in response to the user operation, the content management system 100 creates possible keywords based on the metadata without waiting for the content acquisition to be completed (S22 and S28). When the content management system 100 completely acquires the content without any keyword associated therewith, the content management system 100 creates possible keywords based on the acquired content (S36 or S56).

The content management system 100 extracts, from the search database 50, content acquired in the past that has metadata identical to (or similar to) metadata for newly acquired content. Then, the content management system 100 employs search keywords associated with the extracted content as possible keywords for the newly acquired content.

The content management system 100 extracts, from the search database 50, content acquired in the past that include words identical to (or similar to) words included in content with no keyword associated therewith (unregistered content). Then, the content management system 100 employs search keywords associated with the extracted content as possible keywords for the unregistered content.

The steps S30 and S42 are keyword registering steps of storing the possible keywords, selected by the user from the keyword list displayed, in association with the acquired content.

With the aforementioned technical features, the content management system 100 provides the list of possible keywords (keyword list) at a good time for the user, and it is possible to realize a system configured such that the user can easily register keywords for searching content acquired.

Hereinafter, further description will be given to explain some operations shown in FIGS. 3 and 4. The "unregistered" content stored in S20 in FIG. 3 denotes content without any keyword associated therewith or content associated with unregistered information representing that any keyword is not associated with the content. Here, the "unregistered information representing that any keyword is not associated with the content" is typically a character string "unregistered" which the content management system 100 automatically gives as a search keyword for the unregistered content. The character string "unregistered" automatically given will be described later.

The step S24 may also be executed in the automatic acquisition mode. Therefore, the step S24 may be adopted to control the display unit 24 to display the keyword list in response to a user instruction to begin to acquire the content being accepted. However, even though the step S24 is adopted to control the display unit 24 to display the keyword list in the automatic acquisition mode, the user is likely to be away from the information processing device (MFD 10). Therefore, in consideration of a processing load of the information processing device, it is preferable that the step S24 is adopted to control the display unit 24 not to display the keyword list in the automatic acquisition mode.

3. Detailed Description of Processes

Processes to be executed by the MFD 10 and the server 40 will be described in detail. Here will be exemplified a case where the MFD 10 acquires voice messages (contents). Programs for below-mentioned processes to be executed by the MFD 10 are written in the device-side registration module 18. Programs for below-mentioned processes to be executed by the server 40 are written in the terminal-side registration module 48.

(Processes by MFD)

Figure 5:
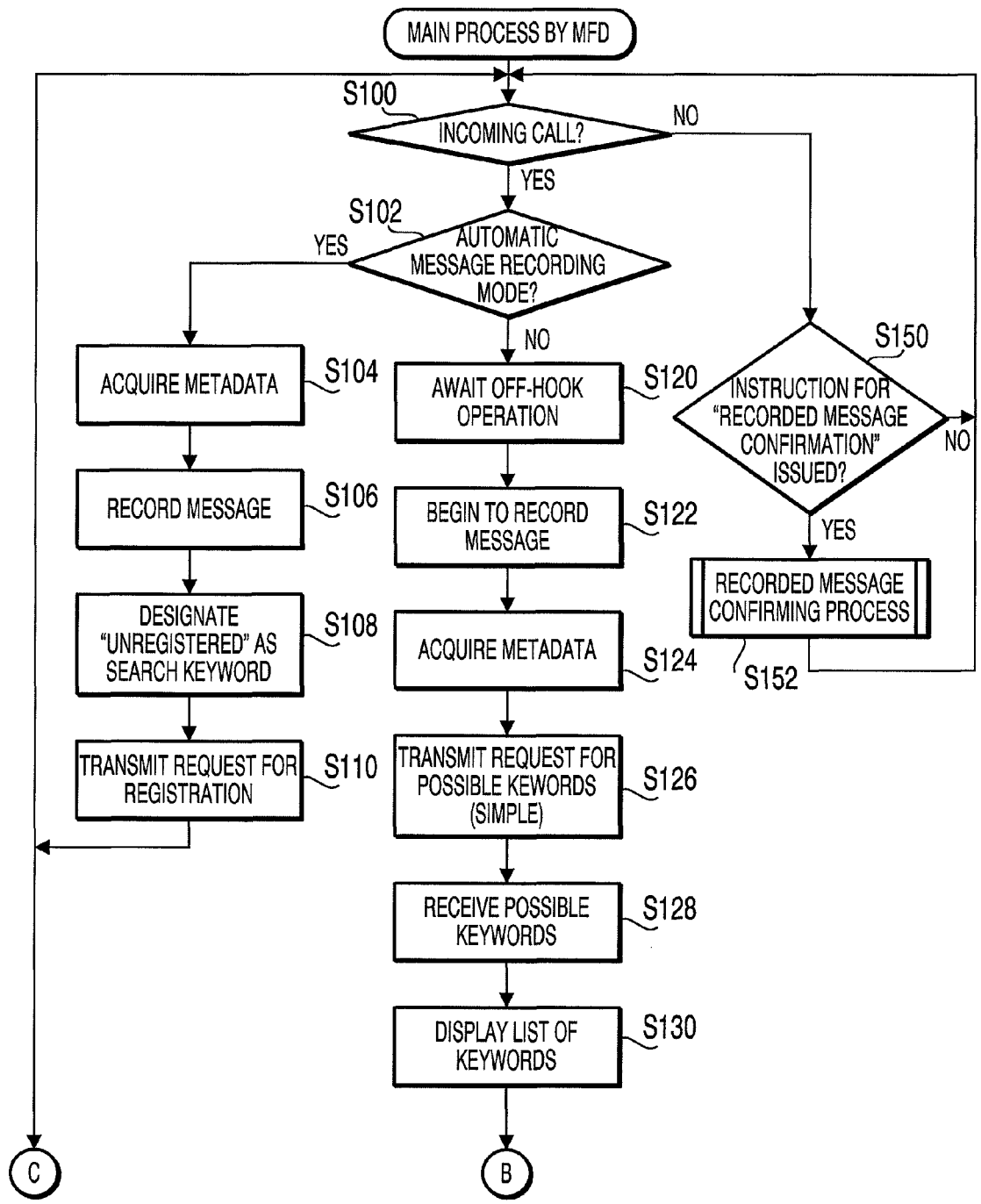
FIGS. 5 and 6 show a single flowchart of a main process to be executed by the MFD in the embodiment according to one or more aspects of the present invention.
Figure 6:
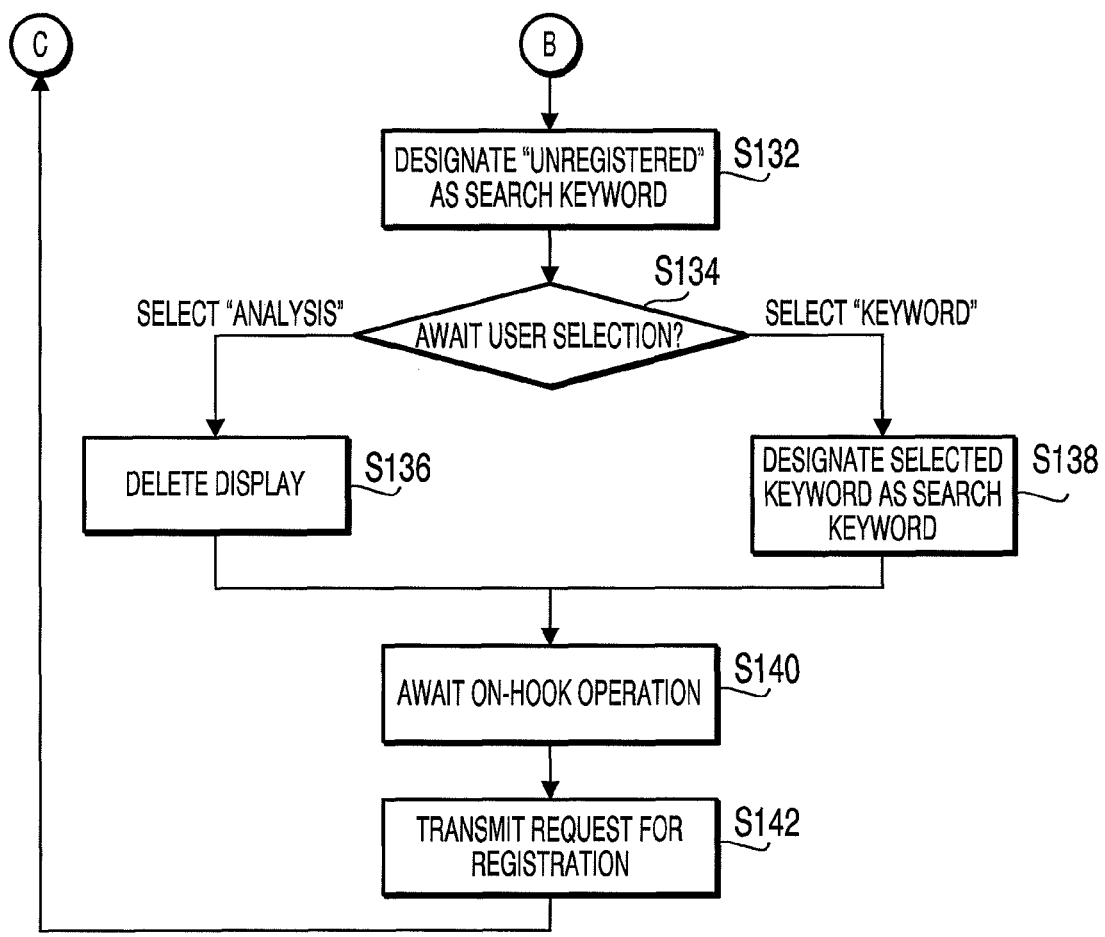

FIGS. 5 and 6 show a flowchart of a main process to be executed by the MFD 10. Processes to be executed by the server 40 in response to some "requests" (commands to the server 40) transmitted by the MFD 10 will be described later.

When detecting an incoming telephone call (S100: Yes), the MFD 10 performs a process that varies depending on whether the MFD 10 is set in the automatic message recording mode (S102). A setting regarding whether the MFD 10 is set in the automatic message recording mode is stored on the RAM 21. When the MFD 10 is set in the automatic message recording mode (S102: Yes). The MFD 10 is automatically transferred to an off-hook state. Then, the MFD 10 acquires metadata about the content (S104). The metadata includes a telephone number of a calling source and a time to start recording of the voice message (voice communication content), namely, a time to acquire the content. Subsequently, the MFD 10 automatically records the message (S106). After completing the automatic recording of the message, the MFD 10 designates a word "unregistered" as a search keyword (S108), and sends to the server 40 a "request for registration" (S110). The "request for registration" is a kind of command to be issued to the server 40. A process to be executed by the server 40 in response to the "request for registration" being received will be described later. In S110, the MFD 10 sends, along with the "request for registration," the metadata acquired in S104, the message data (voice communication content) recorded in S106, and the word "unregistered" designated in S108.

The reason why the word "unregistered" is designated as a search keyword in S108 is that the MFD 10 notifies the server 40 that the acquired content is "unregistered content." Namely, the content for which the word "unregistered" is designated as a search keyword represents content for which no search keyword is designated by the user. In other words, the content set with the word "unregistered" denotes content without any keyword associated therewith. Therefore, by using the search keyword "unregistered," the server 40 can discriminate, from "unregistered contents," the content for which search keywords are designated by the user According to the aforementioned process, in the automatic message recording mode, the received voice message is determined to be acquired with the keyword "unregistered," and stored in the server 40.

Meanwhile, when the MFD 10 is not set in the automatic message recording mode (S102: No), the MFD 10 awaits an off-hook operation. Namely, the MFD 10 waits for the user to pick up the handset 36. When recognizing that the user picks up the handset 36, the MFD 10 begins to record a message (S122). That is, the MFD 10 begins to acquire the content in response to the user operation of "picking up the handset 36" (instruction to start content acquisition).

Subsequently, the MFD 10 acquires metadata about the content (S124) the MFD 10 transmits to the server 40 a "request for possible keywords (simple)" along with the metadata acquired (S126). The "request for possible keywords (simple)" is a command for requesting the server 40 to create possible keywords based on the metadata. The server 40 creates possible keywords in response to the "request for possible keywords (simple)." Then, the server 40 sends the created possible keywords to the MFD 10. The MFD 10 receives the possible keywords and stores the possible keywords received onto the RAM 21 (S128). Thereafter, the MFD 10 displays a list of the possible keywords stored (keyword list) (S130). At the same time, the MFD 10 provisionally designates the word "unregistered" as a search keyword (S132). Then, the MFD 10 awaits user selection of possible keywords from the keyword list (S134). FIG. 7 exemplifies the display on a screen 24a of the display unit 24 in S130. On a sub-window 24b of the screen 24a, the list of the possible keywords created by the server 40 (keyword list) is displayed. In FIG. 7, character strings "Project A" and "Project B" are shown as possible keywords. On the sub-window 24b, a possible keyword selected by the user is indicated by a dashed line. Each of the possible keywords is associated with a thumbnail-size image (reduced image). A thumbnail-size image 24c associated with the possible keyword selected by the user is displayed on the screen 24a.

The sub-window 24b also displays a word "Analysis." The "Analysis" represents not a possible keyword but an instruction issued to the MFD 10. When the user selects the "Analysis," the MFD 10 sends the search keyword "unregistered" provisionally designated to the server 40. Thereby, since the server 40 analyzes the content as unregistered content, it is possible to register search keywords through a user operation (S10) later. When the user thinks it hard to designate keywords during telephone communication, namely, when the user wishes to carefully designate keywords to be associated with the voice communication content, the user is desired to select the "Analysis." As will be mentioned later, in an analysis process, the possible keywords are displayed based on not the metadata but the voice communication content. Therefore, it is possible to associate more suitable keywords with the voice communication content.

Referring back to FIGS. 5 and 6, the explanation of the process to be executed by the MFD 10 will continuously be given. When the user selects the "Analysis" (S134: Select "Analysis"), the MFD 10 deletes the display on the display unit 24 (S136), and awaits an on-hook operation (S140). Namely, the MFD 10 waits for the user to hang up the handset 36. Meanwhile, when the user selects at least one of the possible keywords (S134: Select keyword), the MFD 10 change the keyword for the content from "unregistered" to the selected one (S138), and then awaits the on-hook operation (S140). When detecting the on-hook operation, the MFD 10 terminates recording of the voice message, and transmits the "request for registration" to the server 40 (S142). Thereafter, the present process goes back to S100, in which the MFD 10 awaits another incoming telephone call or another user instruction. It is noted that, in S142, the MFD 10 sends the metadata and the recorded message (voice communication content) along with the "request for registration" in the same manner as the step S110. Further, in S142, the keyword specified as a search keyword is also transmitted. The keyword transmitted in S142 is the user-selected one of the possible keywords (or the word "unregistered" in the case where the user selects the "Analysis").

When any incoming telephone call is not detected (S100: No), and the user issues an instruction for "recorded message confirmation" (S150: Yes), a recorded message confirming process is launched (S152). The instruction for "recorded message confirmation" is inputted to the MFD 10 by the user through the console 22. Namely, the MFD 10 performs the recorded message confirming process in response to the user instruction. In further other words, the MFD 10 performs the recorded message confirming process in response to an instruction to access the stored contents being accepted.

FIG. 8 is a flowchart showing the recorded message confirming process. In response to the user instruction, the MFD 10 transmits a "request for an unregistered content list" to the server 40 (S200). The "unregistered content" denotes content set with the search keyword "unregistered." In other words, the "unregistered content" represents content with no search keyword designated therefor by the user. In further other words, the "unregistered content" represents content associated with no keyword. In response to the "request," the server 40 sends to the MFD 10 a list of the unregistered contents. Specifically, the server 40 sends a list of content IDs for identifying the unregistered contents. The MFD 10 receives and displays the list of the unregistered contents (the list of content IDs) transmitted by the server 40 S202 and S204). Then, the MFD 10 awaits user selection (S206). The user selects desired content to be associated with search keywords. The MFD 10 transmits to the server 40 a "request for possible keywords (detail)" along with the content ID of the selected content (S208). The "request for possible keywords (detail)" is a command to request the server 40 to create possible keywords based on the content. The server 40 creates possible keywords for the content identified by the content ID. The server 40 transmits the created possible keywords to the MFD 10. In addition, the server 40 also sends the content corresponding to the selected content ID to the MFD 10.

The MFD 10 receives the possible keywords created by the server 40 (S210). At this time, the MFD 10 also receives from the server 40 the content corresponding to the content ID selected. The received possible keywords (keyword list) and the content are stored on the RAM 21. The MFD 10 displays the list of the possible keywords received (keyword list), and reproduces the content (recorded message) (S212). In other words, in S206, the content to be stored on the RAM 21 is selected. Then, the MFD 10 waits the user to select desired one or more of the possible keywords (S214). Namely, the user can select, from the possible keywords displayed, desired possible keywords as search keywords for the content. When the user does not select any keyword (S214: No), the MFD 10 terminates the recorded message confirming process. When the user designates possible keywords (S214: Yes), the MFD 10 specifies the possible keywords selected by the user as search keywords (S216). The MFD 10 sends the possible keywords selected by the user to the server 40 along with a "request for registration" (S218). It is noted that the MFD 10 is preferred to be configured to transmit to the server 40 the selected possible keywords along with the content ID selected. In addition, the word "Analysis" is not displayed on the list of the possible keywords displayed in response to the "request for possible keywords (detail)." This is because the contents registered on the server 40 are all to be analyzed.

(Description of Search Database)

Prior to describing processes to be executed by the server 40, a structure of the search database 50 managed by the server 40 will be explained. FIG. 9 exemplifies a structure of the search database 50. It is noted that the search database may be referred to as a content table. The search database 50 has one or more records registered therein, each of which includes content acquired, metadata about the content, and a search keyword associated with the content. Horizontally aligned data in FIG. 9 represent a single record. Each record has a content ID attached thereto for identifying the record. The acquired content is stored as a file. Each record has a file name that includes a path indicating a storage location of content acquired of the record. The file name with the path specifies where the content is located. Each record includes metadata. Each record exemplified in FIG. 9 has metadata items of a "content type," a "telephone number," an "F code," and "date and time." Metadata specific to the content is stored in each metadata item. The "content type" denotes a function used for acquiring the content. The search database 50 in FIG. 9 shows that the contents "D001" and "D003" have been acquired with the function "receipt of facsimile data." Further, the search database 50 describes that the content "D002" has been acquired with the function "transmission of facsimile data," and additionally, that the content "D004" has been acquired with the function "recording." In addition, each record has a file name written therein along with a path for a thumbnail-size image (reduced image) for the content acquired. In the item "search keyword," the search keyword specified by the user or the word "unregistered" designated by the MFD 10 is written. In the item "analysis result," words extracted by the server 40 from the content are written. In a record of content for which the server 40 has not extracted any word (i.e., unregistered content), a word "awaiting analysis" is stored.

(Processes by Server)

FIG. 10 is a flowchart of a main process to be executed by the server 40. The server 40 is configured to receive various kinds of "requests" from the MFD 10. The "requests" include a "request for possible keywords (simple)," "request for possible keywords (detail)," "request for a list of unregistered contents," and "request for registration." What each of the "requests" represents has been described above along with the explanation of the processes by the MFD 10. Depending on what kind of "request" is received from the MFD 10 (S300), the server 40 executes a possible keyword creating process (simple) (S302), a possible keyword creating process (detail) (S304), an unregistered content list creating process (S306), or a registration process (S308). Subsequent to the registration process, the server 40 performs an analysis process (S310). The analysis process is executed for all the registered contents, in which words are extracted from each of the contents. The extracted words are stored in the item "analysis result" of the search database 50 (see FIG. 9). The content with the keywords registered in the analysis process qualifies as a candidate for which possible keywords are created based on the content in the possible keyword creating process (detail) (S304). Hereinafter, each process to be executed by the server 40 will be described.

(Possible Keyword Creating Process (Simple))

FIG. 11 is a flowchart of the possible keyword creating process (simple). The process is launched in response to the "request for possible keywords (simple)" being received from the MFD 10. The MFD 10 transmits the "request for possible keywords (simple)" in S126 (see FIG. 5). The server 40 receives metadata along with the "request for possible keywords (simple)" from the MFD 10 (S400). When the content acquired is a recorded voice message, as exemplified in FIG. 9, the metadata includes the "content type," the "telephone number," and the "date and time."

The server 40 specifies a record having metadata similar to the received metadata in the below-mentioned steps S404 to S410. The server 40 selects one of the records already registered (S404). Then, the server 40 compares the metadata for the selected record with the metadata registered in the below-mentioned step S704 in FIG. 14 (S406). The server 40 makes a comparison between the metadata in accordance with the following rules, and gives a score to a record having similar metadata (S408). Then, one or more records with higher scores than those of any other record are specified as records with similar metadata.

Give a higher score to a record with a closer date and time.
Give a score to a record with the same telephone number.
Give a score to a record with the same content acquiring method, when the content type is the "recorded voice message."
Give a score to a record with the same communication direction represented by "receipt" when the content type is the "receipt of facsimile data."
Give a score to a record with a different method and a different communication direction when the content type is the "transmission of facsimile data."
Give a score to a record with the same sheet size.
Give a score to a record with the same communication speed.

The server 40 repeatedly executes the aforementioned score adding process (S404 to S408) until the process is carried out for all the records registered on the search database 50 (S410: No). After completing the score adding process for all the records (S410: Yes), the server 40 selects one or more records with higher scores than those of any other record (S412). For example, top four records with the highest scores are selected. Next, the server 40 extracts from the search database 50 (S414) search keywords already associated with the selected records. The server 40 transmits to the MFD 10 the extracted search keywords as newly acquired possible keywords (S416).

(Possible Keyword Creating Process (Detail))

FIG. 12 is a flowchart of the possible keyword creating process (detail). The process is launched in response to the "request for possible keywords (detail)" being received from the MFD 10. The MFD 10 transmits the "request for possible keywords (detail)" in S208 (see FIG. 8). The server 40 receives from the MFD 10 a content ID along with the "request for possible keywords (detail)" (S500). The content ID is designated by the user to identify content to which the user desires to give a search keyword (see S206 and S208 in FIG. 8). Subsequently, the server 40 extracts from the search database 50 the record identified with the received content ID (S502).

The server 40 specifies a record having similar content to the content identified with the received content ID in the below-mentioned steps S504 to S510. The server 40 selects one of the records already registered on the search database 50 (S504). In this step, however, the record extracted in S502 is excluded. Then, the server 40 compares the content of the record extracted in S502 with the content of the selected record (S506). The server 40 makes a comparison between the contents in accordance with the following rule and gives a score to a record having similar content (S508). Then, one or more records with higher scores than those of any other record are specified as records with similar contents.

Give a score to a record having content which includes the same word. At this time, the more same words content of a record includes, a higher score the record can gain. It is noted that words included in the content are registered in the item "analysis result" of the search database 50.

The server 40 makes a comparison between the metadata and gives a score to a record having similar metadata. The rules for making a comparison between the metadata are the same as those explained in the aforementioned "possible keyword creating process (simple)."

The server 40 repeatedly executes the aforementioned score adding process (S504 to S508) until the process is carried out for all the records registered on the search database 50 (S510: No). After completing the score adding process for all the records (S510: Yes), the server 40 selects one o more records with higher scores than those of any other record (S512). For example, top four records with the highest scores are selected. Subsequently, the server 40 extracts from the search database 50 search keywords already associated with the selected records (S514). The server 40 transmits to the MFD 10 the extracted search keywords as possible keywords of the content designated by the user (i.e., the content specified with the content ID received in S500) (S516).

(Unregistered Content List Creating Process)

FIG. 13 is a flowchart of the unregistered content list creating process. The process is launched in response to the "request for an unregistered content list" being received from the MFD 10. The MFD 10 transmits the "request for an unregistered content list" in S200 (see FIG. 8). The server 40 receives from the MFD 10 the "request for an unregistered content list" (S600). The server 40 extracts from the search database 50 records in which the word "unregistered" is written in the item "search keyword" (S602). Referring to the item "date and time" of the extracted records, the server 40 sorts the extracted records in order of the date and time (S604). The server 40 transmits to the MFD 10 the content IDs of the extracted records as an unregistered content list (S606).

(Registration Process)

FIG. 14 is a flowchart of the registration process. The process is launched in response to the "request for registration" being received from the MFD 10. The MFD 10 transmits the "request for registration" in S110 (see FIG. 5), S142 (see FIG. 6), and S218 (FIG. 8). The MFD 10 sends the keyword along with the "request for registration." In addition, the MFD 10 sends either the acquired content and metadata or the content ID of the content along with the "request for registration." In S10 and S142, the MFD 10 transmits the content and metadata along with the "request for registration." In S218, the MFD 10 transmits the content ID along with the "request for registration." The server 40 receives the "request for registration" and the keyword (S700). It is noted that, as described above, the server 40 may receive the content and metadata along with the "request for registration." The received keyword is the user-selected possible keyword (S142 or S218) or the word "unregistered" automatically designated by the MFD 10 (S110 or S142). It is noted that, in S142, either the user-selected possible keyword or the word "unregistered" automatically designated by the MFD 10 is transmitted (see S134 in FIG. 6).

When receiving the content along with the "request for registration" (S702: Yes), the server 40 registers on the search database 50 the received content and metadata as a new record (S704). At this time, the server 40 creates a content ID for identifying the newly registered content. The created content ID is registered in the new record on the search database 50 in association with the newly registered content. Further, the server 40 registers the word "awaiting analysis" in the item "analysis result" of the new record (S706).

Finally, the server 40 registers the keyword received along with the "request for registration" in the record on the search database 50 (S708). Namely, the server 40 writes the received keyword in the item "search keyword" of the record. When the server 40 receives the content along with the "request for registration," the received keyword is registered in the new record. Meanwhile, when the server 40 receives the content ID, the received keyword is registered in the record identified with the content ID received.

The search keyword associated with the content in the aforementioned process is utilized for searching the content registered. By designating a desired search keyword, the user can specify content associated with the search keyword designated. The search keyword is also utilized for classifying the contents acquired.

The content management system 100 in the embodiment has the following technical features. After the content is acquired, possible keywords are created based on the acquired content. In the meantime, while the content is being acquired, possible keywords are created based on the metadata about the content being acquired. The metadata is defined along with the start of content acquisition.

Hereinabove, the embodiments according to aspects of the present invention have been described. The present invention can be practiced by employing conventional materials, methodology and equipment. Accordingly, the details of such materials and equipment and methodology are not set forth herein in detail. In the previous descriptions, numerous specific details are set forth, such as specific materials, structures, chemicals, processes, etc., in order to provide a thorough understanding of the present invention. However, it should be recognized that the present invention can be practiced without reapportioning to the details specifically set forth. In other instances, well known processing structures have not been described in detail, in order not to unnecessarily obscure the present invention.

Only exemplary embodiments of the present invention and but a few examples of its versatility are shown and described in the present disclosure. It is to be understood that the present invention is capable of use in various other combinations and environments and is capable of changes or modifications within the scope of the inventive concept as expressed herein.

For example. The content management system 100 (information processing device) may be configured as a single device adopted to perform the processes shown by the flowcharts in FIGS. 3 and 4.

What is claimed is:

1. An information processing device configured to manage acquired content in association with at least one keyword, comprising:

a hardware memory configured to store computer-readable instructions thereon;

an instruction accepting unit configured to accept a user instruction;

an acquiring unit configured to acquire content in one of an automatic content acquisition mode, in which the acquiring unit automatically begins acquiring the content without waiting for the instruction accepting unit to accept a first user instruction, and a user-instructed content acquisition mode, in which the acquiring unit begins acquiring the content in response to the first user instruction accepted by the instruction accepting unit to begin the content acquisition;

a storage configured to store the content acquired by the acquiring unit;

a keyword creating unit configured to create keywords for specifying the acquired content;

a display unit configured to display the keywords created by the keyword creating unit;

a controller configured to execute the computer-readable instructions stored in the memory, such that the computer-readable instructions instruct the controller to:

when the acquiring unit acquires the content in the automatic content acquisition mode, control the keyword creating unit to create the keywords and control the display unit to display the created keywords, in response to the instruction accepting unit accepting a second user instruction to access the content stored in the storage, and when the acquiring unit acquires the content in the user-instructed content acquisition mode, control the keyword creating unit to automatically create the keywords and controls the display unit to automatically display the created keywords after the acquisition of the content is begun, without waiting for the instruction accepting unit to accept the second user instruction to access the content stored on the storage; and a storage control unit configured to control the storage to store the content as unregistered content after the content is acquired in the automatic content acquisition mode, wherein the unregistered content is not associated with any keyword.

2. The information processing device according to claim 1, further comprising:

a keyword selecting unit configured to select at least one of the keywords displayed on the display unit, wherein the storage control unit is configured to control the storage to register the content in association with the at least one keyword selected through the keyword selecting unit.

3. The information processing device according to claim 2, wherein the computer-readable instructions instruct the controller to, when the content is acquired in the user-instructed content acquisition mode, control the display unit to display, as well as the created keywords, information for storing the content as the unregistered content, and wherein the storage control unit is configured to, when the information is selected through the keyword selecting unit, store the content as the unregistered content.

4. The information processing device according to claim 3, wherein the computer-readable instructions instruct the controller to, when the content is acquired in the user-instructed content acquisition mode and stored as the registered content, control the keyword creating unit to create the keywords based on the content in response to the instruction to access the stored content being accepted through the instruction accepting unit.

5. The information processing device according to claim 1, wherein the acquiring unit is configured to acquire metadata about the content along with the content, and wherein the computer-readable instructions instruct the controller to, while the content is being acquired in the user-instructed content acquisition mode along with the metadata about the content, control the keyword creating unit to create the keywords based on the metadata.

6. The information processing device according to claim 1, wherein the computer-readable instructions instruct the controller to, after the content is acquired in the automatic content acquisition mode, control the keyword creating unit to create the keywords based on the content in response to the instruction to access the content stored on the storage being accepted through the instruction accepting unit.

7. The information processing device according to claim 1, wherein, in the automatic content acquisition mode, the acquiring unit is configured to acquire the content in response to receiving an incoming telephone call, without waiting for the instruction accepting unit to accept the first user instruction after detecting the incoming telephone call, and wherein, in the user-instructed content acquisition mode, the acquiring unit is configured to acquire the content in response to the instruction accepting unit accepting the first user instruction after detecting the incoming telephone call.

8. A content management system configured to manage acquired content in association with at least one keyword, comprising:

a hardware memory configured to store computer-readable instructions thereon;

an instruction accepting unit configured to accept a user instruction;

an acquiring unit configured to acquire content in one of an automatic content acquisition mode, in which the acquiring unit automatically begins acquiring the content without waiting for the instruction accepting unit to accept a first user instruction, and a user-instructed content acquisition mode, in which the acquiring unit begins acquiring the content in response to the first user instruction accepted by the instruction accepting unit to begin the content acquisition;

a storage configured to store the content acquired by the acquiring unit;

a keyword creating unit configured to create keywords for specifying the acquired content;

a display unit configured to display the keywords created by the keyword creating unit; and a controller configured to execute the computer-readable instructions stored in the memory, such that the computer-readable instructions instruct the controller to:

when the acquiring unit acquires the content in the automatic content acquisition mode, control the keyword creating unit to create the keywords and control the display unit to display the created keywords, in response to the instruction accepting unit accepting a second user instruction to access the content stored in the storage, and when the acquiring unit acquires the content in the user-instructed content acquisition mode, control the keyword creating unit to automatically create the keywords and control the display unit to automatically display the created keywords, after the acquisition of the content is begun, without waiting for the instruction accepting unit to accept the second user instruction to access the content stored in the storage; and a storage control unit configured to control the storage to store the content as unregistered content after the content is acquired in the automatic content acquisition mode, wherein the unregistered content is not associated with any keyword.

9. The content management system according to claim 8, further comprising:

a keyword selecting unit configured to select at least one of the keywords displayed on the display unit, wherein the storage control unit is configured to control the storage to register the content in association with the at least one keyword selected through the keyword selecting unit.

10. The content management system according to claim 9, wherein the computer-readable instructions instruct the controller to, when the content is acquired in the user-instructed content acquisition mode, control the display unit to display, as well as the created keywords, information for storing the content as the unregistered content, and wherein the storage control unit is configured to, when the information is selected through the keyword selecting unit, store the content as the unregistered content.

11. The content management system according to claim 10, wherein the computer-readable instructions instruct the controller to, when the content is acquired in the user-instructed content acquisition mode and stored as the registered content, control the keyword creating unit to create the keywords based on the content in response to the instruction to access the stored content being accepted through the instruction accepting unit.

12. The content management system according to claim 8, wherein the acquiring unit is configured to acquire metadata about the content along with the content, and wherein the computer-readable instructions instruct the controller to, while the content is being acquired in the user-instructed content acquisition mode along with the metadata about the content, control the keyword creating unit to create the keywords based on the metadata.

13. The content management system according to claim 8, wherein the computer-readable instructions instruct the controller to, after the content is acquired in the automatic content acquisition mode, control the keyword creating unit to create the keywords based on the content in response to the instruction to access the content stored on the storage being accepted through the instruction accepting unit.

14. The content management system according to claim 8, comprising a data acquiring device and a content management device,
wherein the data acquiring device includes:
the instruction accepting unit;
the acquiring unit; and
the display unit, and
wherein the content management device includes:
the storage; and
the keyword creating unit.

15. The content management system according to claim 14 wherein the data acquiring device and the content management device perform a cooperative operation of controlling the keyword creating unit and the display unit,
wherein, in the cooperative operation, when the content is acquired in the automatic content acquisition mode, the keyword creating unit and the display unit are controlled to create and display the keywords, respectively, in response to an instruction to access the content stored on the storage being accepted through the instruction accepting unit, and
wherein, in the cooperative operation, when the content is acquired in the user-instructed content acquisition mode, the keyword creating unit and the display unit are controlled to create and display the keywords, respectively, automatically without awaiting an instruction.

16. The content management system according to claim 8,
wherein, in the automatic content acquisition mode, the acquiring unit is configured to acquire the content in response to receiving an incoming telephone call, without waiting for the instruction accepting unit to accept the first user instruction after detecting the incoming telephone call, and
wherein, in the user-instructed content acquisition mode, the acquiring unit is configured to acquire the content in response to the instruction accepting unit accepting the first user instruction after detecting the incoming telephone call.

17. A method for managing acquired content in association with at least one keyword, comprising:
an acquiring step of acquiring content in one of an automatic content acquisition mode, in which the acquiring step begins automatically without waiting for a receipt of a first user instruction, and a user-instructed content acquisition mode, in which the acquiring step begins in response to receiving the first user instruction to begin the content acquisition;
a storing step of storing the content acquired in the acquiring step in a storage medium;
a keyword creating step of creating keywords for specifying the acquired content;
a displaying step of displaying the keywords created in the keyword creating step; and
when the content is acquired in the automatic content acquisition mode, creating keywords for specifying the acquired content and displaying the keywords created in the keyword creating step in response to receiving a second user instruction to access the content stored in the storage medium, and
when the content is acquired in the user-instructed content acquisition mode, automatically creating keywords for specifying the acquired content and automatically displaying the keywords created in the keyword creating step after the acquisition of the content is begun, without waiting for the receipt of the second user instruction to access the content stored in the storage medium,
wherein the storing step comprises storing the content as unregistered content after the content is acquired in the automatic content acquisition mode, and
wherein the unregistered content is not associated with any keyword.

18. The method according to claim 17,
wherein, in the automatic content acquisition mode, the content is acquired in response to receiving an incoming telephone call, without waiting for the receipt of the first user instruction after detecting the incoming telephone call, and
wherein, in the user-instructed content acquisition mode, the content is acquired in response to receiving the first user instruction after detecting the incoming telephone call.

19. A non-transitory computer readable medium having computer executable instructions stored thereon, which cause a computer to perform:
an acquiring step of acquiring content in one of an automatic content acquisition mode, in which the acquiring step begins automatically without waiting for a receipt of a first user instruction, and a user-instructed content acquisition mode, in which the acquiring step begins in response to receiving the first user instruction to begin the content acquisition;
a storing step of storing the content acquired in the acquiring step in a storage medium;
a keyword creating step of creating keywords for specifying the acquired content;
a displaying step of displaying the keywords created in the keyword creating step; and
when the content is acquired in the automatic content acquisition mode, creating keywords for specifying the acquired content and displaying the keywords created in the keyword creating step in response to receiving a second user instruction to access the content stored in the storage medium, and
when the content is acquired in the user-instructed content acquisition mode, automatically creating keywords for specifying the acquired content and automatically displaying the keywords created in the keyword creating step after the acquisition of the content is begun, without waiting for the receipt of the second user instruction to access the content stored in the storage medium; and
wherein the storing step comprises storing the content as unregistered content after the content is acquired in the automatic content acquisition mode, and
wherein the unregistered content is not associated with any keyword.

20. The non-transitory computer readable medium according to claim 19,
wherein, in the automatic content acquisition mode, the content is acquired in response to receiving an incoming telephone call, without waiting for the receipt of the first user instruction after detecting the incoming telephone call, and wherein, in the user-instructed content acquisition mode, the content is acquired in response to receiving the first user instruction after detecting the incoming telephone call.

21. An information processing device configured to be connected with an external device, comprising:
a hardware memory configured to store computer-readable instructions thereon;
an instruction accepting unit configured to accept a user instruction;
an acquiring unit configured to acquire content in one of an automatic content acquisition mode, in which the acquiring unit automatically begins acquiring the content without waiting for the instruction accepting unit to accept a first user instruction, and a user-instructed content acquisition mode, in which the acquiring unit begins acquiring the content in response to the first user instruction accepted by the instruction accepting unit to begin the content acquisition;
a keyword requesting unit configured to issue a request for keywords to the external device;
a keyword receiving unit configured to receive keywords from the external device;
a display unit configured to display the keywords received by the keyword receiving unit; and
a controller configured to execute the computer-readable instructions stored in the memory, such that the computer-readable instructions instruct the controller to:
when the acquiring unit acquires the content in the automatic content acquisition mode, control the keyword requesting unit to issue the request for keywords to the external device, control the keyword receiving unit to receive the keywords from the external device, and control the display unit to display the received keywords, in response to a second user instruction accepted by the instruction accepting unit to access the content stored in the external device, and
when the acquiring unit acquires the content in the user-instructed content acquisition mode, control the keyword requesting unit to automatically issue the request for keywords to the external device, control the keyword receiving unit to automatically receive the keywords from the external device, and control the display unit to automatically display the received keywords after the acquiring of the content is begun, without waiting for the instruction accepting unit to accept the second user instruction to access the content stored in the external device; and
a storage control unit configured to control the external device to store the content as unregistered content after the content is acquired in the automatic content acquisition mode,
wherein the unregistered content is not associated with any keyword.

22. The information processing device according to claim 21,
wherein, in the automatic content acquisition mode, the acquiring unit is configured to acquire the content in response to receiving an incoming telephone call, without waiting for the instruction accepting unit to accept the first user instruction after detecting the incoming telephone call, and
wherein, in the user-instructed content acquisition mode, the acquiring unit is configured to acquire the content in response to the instruction accepting unit accepting the first user instruction after detecting the incoming telephone call.

23. An information processing device configured to access a content management device that manages acquired content in association with at least one keyword, the information processing device comprising:
a processor;
a hardware memory configured to store computer-readable instructions thereon, the computer-readable instructions controlling the processor to function as a plurality of units comprising:
an instruction accepting unit configured to accept a user instruction;
an acquiring unit configured to acquire content in one of a user-instructed content acquisition mode to begin acquiring the content in response to the instruction accepting unit accepting a first user instruction to begin acquiring the content and an automatic content acquisition mode to automatically begin acquiring the content without waiting for the instruction unit to accept the first user instruction;
a keyword requesting unit configured to:
when the acquiring unit acquires the content in the automatic content acquisition mode, issue to the content management device a keyword request for keywords for specifying the content, in response to the instruction accepting unit accepting a second user instruction to access content stored in a storage unit; and
when the acquiring unit acquires the content in the user-instructed content acquisition mode, issue to the content management device the keyword request for the keywords for specifying the content, without waiting for the instruction accepting unit to accept the second user instruction;
a keyword receiving unit configured to receive the keywords transmitted from the content management device in response to the keyword request; and
a registration request transmitting unit configured to transmit to the content management device a registration request that contains at least one keyword selected from the received keywords and requests the content management device to manage the content in association with the at least one keyword selected from the received keywords; and
a storage control unit configured to control the storage unit to store the content as unregistered content after the content is acquired in the automatic content acquisition mode,
wherein the unregistered content is not associated with any keyword; and
a display unit configured to display the keywords received by the keyword receiving unit.

24. The information processing device according to claim 23,
wherein, in the automatic content acquisition mode, the acquiring unit is configured to acquire the content in response to receiving an incoming telephone call, without waiting for the instruction accepting unit to accept the first user instruction after detecting the incoming telephone call, and
wherein, in the user-instructed content acquisition mode, the acquiring unit is configured to acquire the content in response to the instruction accepting unit accepting the first user instruction after detecting the incoming telephone call.

* * * * *